Feb. 20, 1923.

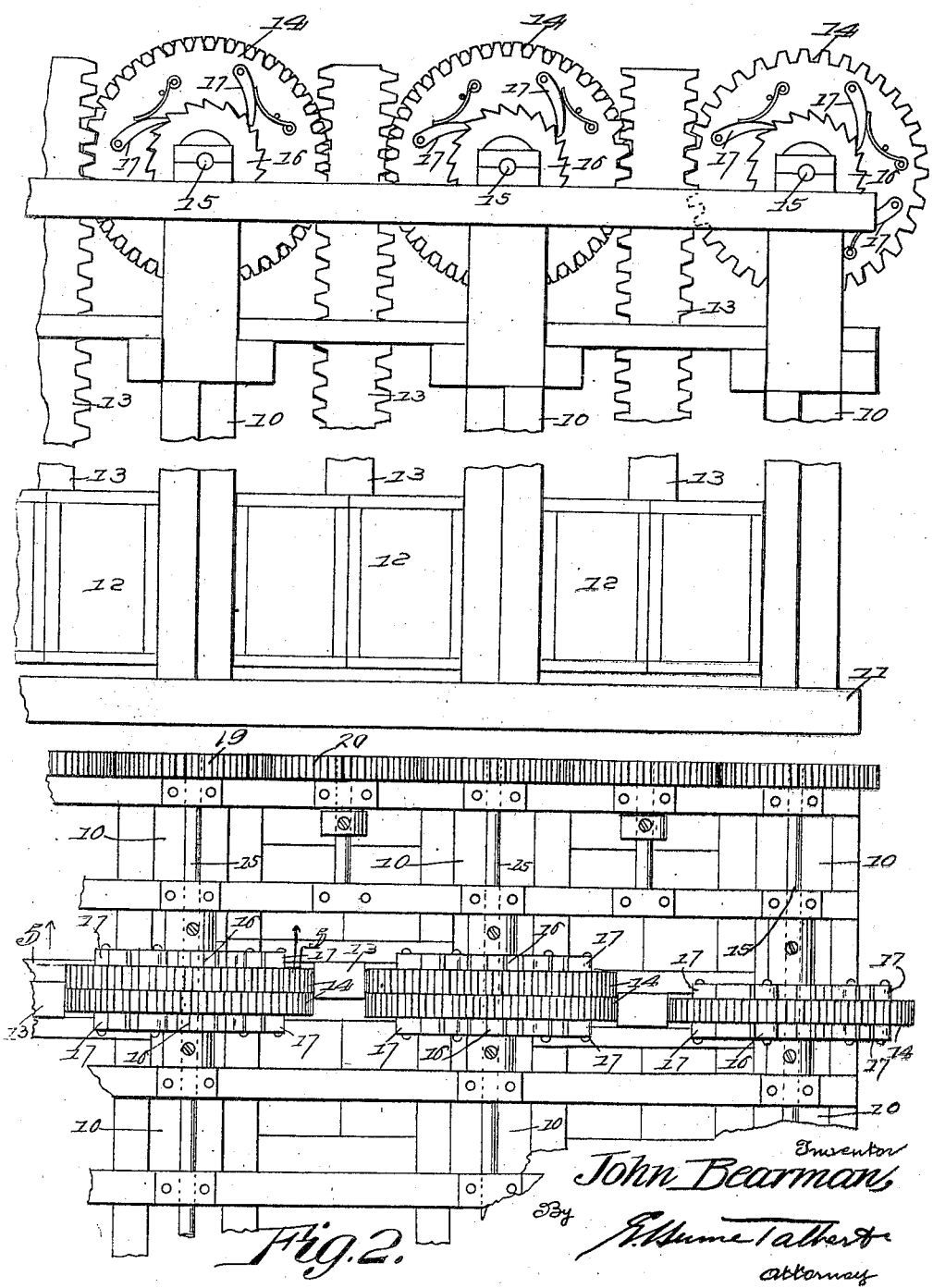

J. BEARMAN.
WAVE MOTOR.
FILED JULY 9, 1920.

John Bearman,
Inventor

Patented Feb. 20, 1923.

1,446,286

UNITED STATES PATENT OFFICE.

JOHN BEARMAN, OF BIRMINGHAM, ALABAMA.

WAVE MOTOR.

Application filed July 9, 1920. Serial No. 394,946.

*To all whom it may concern:*

Be it known that I, JOHN BEARMAN, a citizen of the United States of America, residing at Birmingham, in the county of Jefferson and State of Alabama, have invented new and useful Improvements in Wave Motors, of which the following is a specification.

The object of the invention is to provide a tide and wave motor adapted especially for use on the sea shore for actuation by means of floats to impart rotary motion in a common direction to a driven element from which power may be communicated to a generator of the elementary or other type whereby the storage of energy may be effected as by storage batteries or the like; and to provide a mechanism which is adapted to utilize the movement of the water through a plurality of units operating with a mutual effect upon the driven element while capable of independent operation as distinguished from those devices heretofore designed for utilizing the wave motion wherein a single unit moved by the rise of a wave constitutes the actuating element; and with these objects in view, the invention consists in a construction and combination of parts, of which a preferred embodiment is shown in the accompanying drawings, wherein:—

Figure 1 is a side view of the apparatus.

Figure 2 is a plan view of the same.

Figure 3:
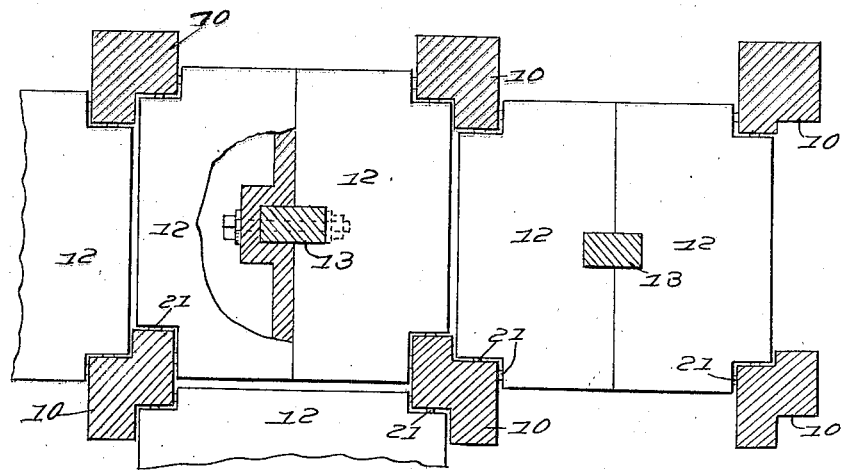
Figure 3 is a transverse horizontal sectional view looking down upon the floats or actuating members of the device.

The apparatus embodies essentially a frame work consisting of substantial uprights 10 upstanding from a suitable base 11 and serving as guides for vertically movable floats 12 carrying rack bars 13 toothed on their opposite edges and meshing with gear wheels 14 carried by transverse shafts 15. Any desired number of floats with their related rack bars and gears each constituting a unit of the mechanism may be arranged in a series or battery with the progression of the series in the direction of movement substantially parallel with the path of the waves or at an angle thereto, the motion of which is to be utilized in the operation of the mechanism, to the end that the wave in approaching the apparatus successively affects the several floats constituting the series and causes a reciprocatory movement of each float independently of those belonging to other units.

The gear wheels are loosely mounted on the shafts 15 and are connected respectively therewith for communicating rotary motion in one direction thereto by means of ratchet mechanisms each consisting of a ratchet wheel 16 and pawls 17. Each of the transverse shafts 15 carries a gear 19 and the whole series are interconnected by idlers 20, any one of the shafts 15 serving as the main driving element by which communication of motion from the apparatus may be had to a second apparatus or machine to be driven thereby.

It will be observed that each transverse shaft is equipped with a pair of gear wheels 14 and the ratchet wheels attendant on the two are oppositely disposed, adjacent floats serving as the operating means for the two gear wheels, so that when one is rising and the other is falling, rotary motion may be transmitted to the shaft in one direction.

Figure 4:
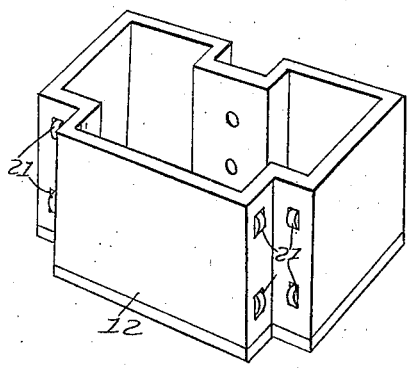
Figure 4 is a perspective view of one of the floats with the cover or top removed.
Figure 5:
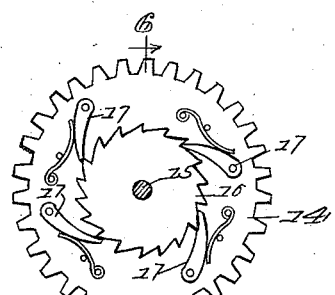
Figure 5 is a section on the line 5—5 of Figure 2.
Figure 7:
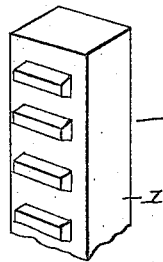
Figure 7 is a perspective detail view showing a portion of one of the rack bars.
Figure 6:
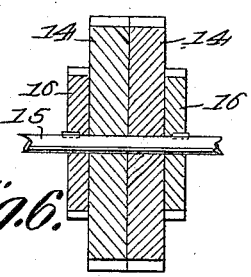
Figure 6 is a section on the line 6—6 of Figure 5.

The pawls 17 attendant on each ratchet wheel are spaced at substantially uniform distances upon the ratchet wheel, but the angular distances between the teeth are so arranged that when one pawl engages the nose of a ratchet tooth, the next succeeding pawl lies substantially on the upper edge of the corresponding tooth, the next pawl a little further back on its attendant tooth, and the next pawl still farther back on its tooth. With this arrangement, angular movement of the gear wheel a distance equal to approximately a quarter of the length of the ratchet tooth will serve to permit one or the other of the pawls engaging the latter. Backlash is, therefore, reduced to a minimum. As indicated in Figure 4, the floats are of hollow construction and are arranged in pairs for attachment to their attendant rack bars, the latter being formed with guideways in which the rack bars rest and the latter being bolted to the float from the inside of the latter. The corners of the floats adjacent the uprights are cut away to provide guideways for the uprights and in these cut away sections, the floats are equipped with anti-friction rollers 21 to reduce the friction in the operation of the device.

With the arrangement indicated, the rise and fall of each float, while causing a corresponding oscillatory movement of the gears connected therewith, causes a rotary movement in one direction of the shaft 15 and, as before stated, the ratchet mechanisms are relatively arranged so that all the transverse shafts rotate in a common direction and are operatively connected by their idlers so that the power output of the whole apparatus represents the sum of all of the units. Whether the operation of the floats is simultaneous or successive, the accumulated impulse due to the several floats is imparted to the device or machine being driven and each float receives a motion commensurate with the maximum movement of the wave, or in other words is affected in its turn by the crest of the wave.

A further advantage of the construction described resides in the fact that as the units are independently actuated and afford a relatively small resistance to the action of the wave, the tendency to injury of the mechanism in the event of a rough sea is minimized. The strain is distributed and applied to the frame work in a more or less accurate manner. Also the uprights are of such a length that provision is made for a relatively great movement of the floats. Thus the floats may position themselves for oscillatory movement in different horizontal planes, as the tide rises and falls.

The invention having been described, what is claimed as new and useful is:—

A motor of the kind described having a frame provided with uprights forming guides, a series of floats mounted in said frame and slidably engaging said guides for movement in vertical planes, the said floats being arranged progressively in the direction of wave motion, a plurality of transverse transmission shafts mounted at the top of the frame and operatively interconnected for rotation in the same direction, gear wheels mounted on said shafts and having pawl and ratchet connections therewith, rack bars carried by the floats and toothed on opposite edges and meshing with gears on adjacent shafts to impart forward movement to one shaft when the float is rising and the other shaft when the float is falling, the floats being of hollow construction and formed with guide ways in which the rack bars rest and to which they are secured by bolts extending from the inside of the floats, the corners of the floats adjacent the uprights being cut away to provide guide ways and anti-friction rollers disposed in the guide ways and engaging the uprights.

In testimony whereof he affixes his signature.

JOHN BEARMAN.